MACHINE FOR TREATING TEXTILE THREAD

Original Filed Sept. 16, 1964 2 Sheets-Sheet 1

INVENTOR.
RUDOLF C. JAEGGLI

BY K. A. Mayr

ATTORNEY

MACHINE FOR TREATING TEXTILE THREAD

Original Filed Sept. 16, 1964 2 Sheets-Sheet 2

INVENTOR.
RUDOLF C. JAEGGLI
BY K. A. Mayer
ATTORNEY

United States Patent Office

Re. 26,847
Reissued Apr. 7, 1970

26,847

MACHINE FOR TREATING TEXTILE THREAD

Rudolf C. Jaeggli, Winterthur, Switzerland, assignor to Rieter Machine Works Ltd., Winterthur, Switzerland, a corporation of Switzerland Original No. 3,317,980, dated May 9, 1967, Ser. No. 396,890, Sept. 16, 1964. Application for reissue Dec. 21, 1967, Ser. No. 710,416
Claims priority, application Switzerland, Sept. 18, 1963, 11,560/63
Int. Cl. D02j *1/22, 13/00*
U.S. Cl. 28—71.3 5 Claims

Matter enclosed in heavy brackets [ ] appears in the original patent but forms no part of this reissue specification; matter printed in italics indicates the additions made by reissue.

*ABSTRACT OF THE DISCLOSURE*

*The heated rotatable thread guide elements of the thread relaxing unit are enclosed within a housing. Each housing is provided with sluice means which permit the thread to enter and to leave the housing while inhibiting the exchange of the gaseous matter between the inside and outside of the housing means. In addition, the housing means can be supplied with air conditioning medium.*

The present invention relates to machines for producing endless threads, such as drafting-twisting, drafting-winding and spinning-drafting and winding machines wherein the moving thread or thread bunch is heated.

Conventional means for heating the running thread are in the form of heated drafting rollers or heating elements slidingly contacted by the thread and interposed between the drafting rollers. Also used are heating tubes or plates which heat the thread by radiation and do not make contact therewith. Since the peripheral speed of drafting rollers is quite great, considerable heat is transferred by convection from the heated drafting rollers to the environment so that the desired high temperature of the surface of the drafting rollers and of the thread running thereon can only be maintained by expending a great amount of heat. The hot drafting rollers considerably heat up the environment so that the absolutely necessary conditioning of the space containing the creeling and winding zone is difficult. In spite of great atmosphere conditioning efforts, local, minor heat variations alongside the machines are unavoidable which is of particular disadvantage when producing yarn to be dyed because it makes uniform dyeing difficult.

The air whirl generated by the heated drafting roller cools the thread running to the reversing roller and cools also this reversing roller so that the thread is cooled before entering the drafting zone proper.

It is an object of the invention to provide drafting-twisting machines, and the like, wherein the thread material is heated in the drafting or relaxation zone by heated, rotatable thread-guiding elements and whereby the aforedescribed disadvantages of conventional machines of this type are avoided.

According to the invention the heated rotatable thread guide elements are placed inside stationary housing means which may be provided with movable parts for opening the housing means and providing access to the rotatable elements.

In an embodiment according to the invention a plurality of rotatable thread guide means are individually enclosed, each enclosure including a movable part for opening the enclosure and actuating means are provided for simultaneously moving the movable parts of a group of enclosures for simultaneously opening and closing all enclosures of the group. The actuating means may be so constructed as to permit opening of individual enclosures without opening the other enclosures.

The housing means are preferably provided with sluice means forming passages allowing thread material to enter and leave the housing means and inhibiting exchange of gaseous matter at the inside and the outside of the housing means.

In an embodiment of the invention the housing means is provided with means supplying atmosphere-conditioning media to and releasing the media from the housing means. The supply means preferably include valve means operatively connected to the parts affording opening of the housing means for simultaneously closing the valve means when the housing means is opened, and vice versa.

The housing means according to the invention may be so constructed as to enclose a plurality of heated rotatable thread guide elements and also one or more stationary heating means, if stationary heating means are present in the thread-treating machine.

The novel features which are considered characteristic of the invention are set forth with particularity in the appended claims. The invention itself, however, and additional objects and advantages thereof will best be understood from the following description of embodiments thereof when read in connection with the accompanying drawing wherein:

Figure 1:
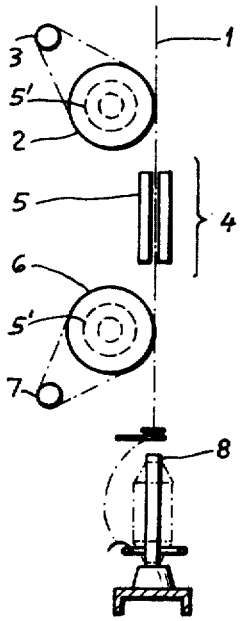
FIG. 1 is a diagrammatic illustration of the drafting and winding zone of a conventional drafting and twisting machine.

In the conventional arrangement shown in FIG. 1 a continuously supplied thread bunch 1 shown by a dash-dot line and consisting of one or more endless fibrils and henceforth called thread moves around a drafting roller 2 and thereafter around a reversing roller 3 and again around the drafting roller wherefrom the thead moves though a drafting zone 4. The latter is often provided with a heater 5. The thread is pulled from the drafting zone by means of a drafting roller 6 rotating more quickly than roller 2 and having a reversing roller 7 associated therewith. The thread is then supplied to a twisting spindle 8 for producing twist and winding the thread. The drafting rollers 2 and 6 may be provided with heating elements 5'.

Figure 2:
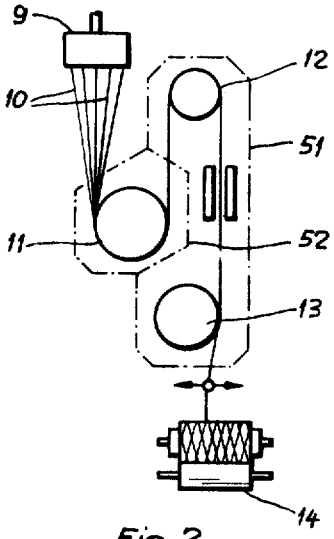
FIG. 2 is a diagrammatic illustration of a spinning, drafting and winding machine equipped according to the invention.

In the spinning, drafting and winding machine shown in FIG. 2 a thread bunch 10 emerging from a spinning nozzle 9 is conducted around a roller 11 which may be heated and is drawn by means of a drafting roller 12 having a greater circumferential speed than the roller 11. After leaving the roller 12 the thread moves through a relaxation zone which may be heated and is withdrawn therefrom by a roller 13 having somewhat less circumferential speed and thereafter wound without twisting by means of a conventional winding device driven, for example, by a friction roller 14.

Figure 3:
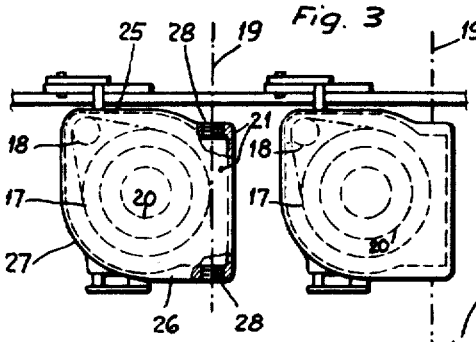
FIG. 3 is a diagrammatic, part-sectional side view of a housing arrangement for drafting rollers in closed position.
Figure 4:
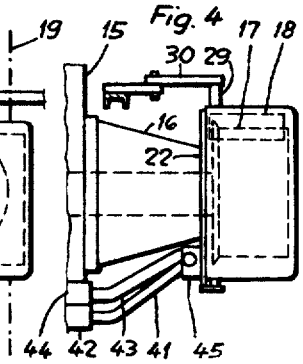
FIG. 4 is a diagrammatic end view of the housing arrangement shown in FIG. 3.
Figure 5:
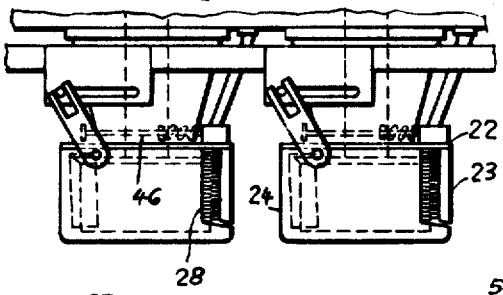
FIG. 5 is a diagrammatic top view of the arrangement shown in FIG. 3, with the housing units closed.
Figure 6:
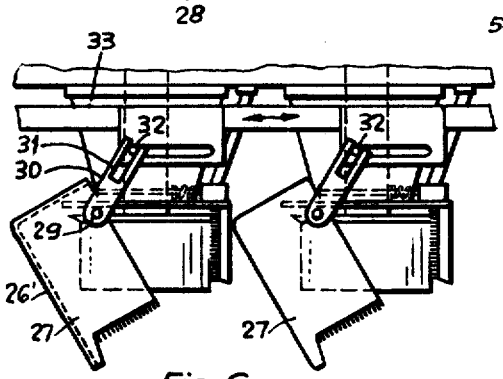
FIG. 6 is a diagrammatic top view of the arrangement shown in FIG. 3, with the housing units in open position.

FIG. 4 shows a housing arrangement according to the invention for machines of the type shown in FIGS. 1 and 2. A gearbox 15 part of which is shown in FIG. 4 is placed alongside the machine and carries by means of a bearing element 16 a plurality of driven drafting rollers 17 each of which is associated with a freely rotating reversing roller 18 (FIG. 3) around which a thread 19 is wound in several windings. A heating element 20 is accommodated in the rollers 17. Each roller 17 with its associated roller 18 is placed in a housing 21 whose rear wall 22 and side wall 23 are rigidly connected to the bearing element 16 (FIGS. 5 and 6). The opposite side wall 24, the top wall 25, the bottom wall 26 and the front wall 26' form a housing unit 27 which is swingably connected to the element 16.

To provide passage for the thread 19 into and out of the housing, slots are provided between the top wall 25 and the bottom wall 26 formed by the unit 27 and the side wall 23. The slots are provided with a thread sluice 28 consisting substantially of two opposite antistatic skin or plush cushions which permit easy passage of the thread but provide sufficient seal to prevent passage of gas or vapor. A vertical bolt 29 and a lever 30 are rigidly connected to each swingable unit 27. The free ends of the levers 30 are provided with slots 31 individually accommodating pins 32 which are rigidly connected to an actuating rail 33. There is a pin 32 for each lever 30. Longitudinal movement of the rail 33 causes swinging of all housing units 27 and permits access to all drafting rollers.

Figure 8:
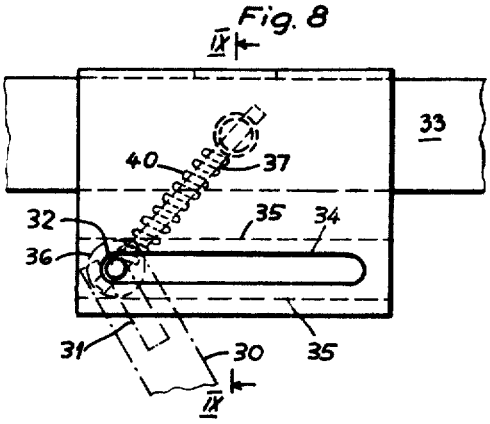
FIG. 8 is a top view of a detail of the arrangement shown in FIGS. 3 to 7.
Figure 9:
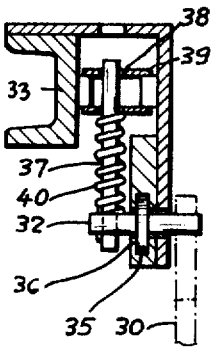
FIG. 9 is a cross-sectional view of the arrangement shown in FIG. 8, the section being made along line IX—IX of FIG. 8.

In order to permit inspection of individual drafting rollers without opening the housings of the other drafting rollers, a mechanism is provided which is shown in FIGS. 8 and 9. Each pin 32 is movable in a slot 34 which is parallel with the rail 33 and provided in an attachment to said rail. A circular sliding element 36 is mounted on each pin 32 and capable of sliding in a slideway 35. A pin 37 placed below the rail 33 is mounted on the pin 32 and placed normal thereto. The pin 37 is slidable in a bore 38 in a rotatable bushing 39. A helical spring 40 wound around the pin 37 tends to hold the pin 32 at one of the ends of the slot 34. By overcoming the pressure of the spring 40 each housing unit 27 can be opened without longitudinally moving the rail 33.

For conditioning the inside of the housings for the drafting rollers conduits 41 are provided which are connected to a conduit 42 (FIG. 4) which conducts a medium for controlling the atmosphere inside the housings. The medium is returned through conduits 43 to a suction channel 44. To avoid escape of the medium when opening a housing unit 27 and to avoid an undesired change of the ambient climate exchange of the media inside and outside the housing when opening the housing a valve 45 is provided in the conduits 41 and 43. The valve 45 is provided with a valve stem 46 (FIGS. 5 and 6) which is operatively connected to the lever 30 for movement to the right, for closing supply conduit 41, against the pressure of a suitable spring when a housing unit is opened.

Figure 7:
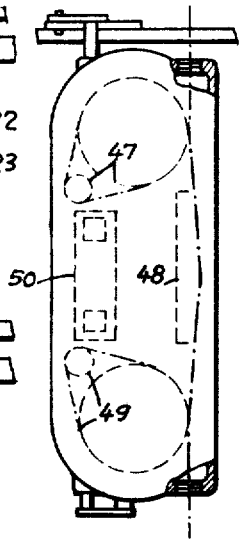
FIG. 7 is a diagrammatic side view of a drafting zone having rotatable and stationary heating elements which are enclosed in a common housing according to the invention.

FIG. 7 illustrates an arrangement according to the invention whereby an entire drafting zone together with its heating means is separated from the ambient atmosphere. The housing unit is enlarged in a downward direction so as to enclose an upper pair of rollers 47 and a lower pair of rollers 49 as well as a heater 48 therebetween. The mechanism for opening and closing the housing unit and the means for controlling the supply and release of climate conditioning media by a valve 50 which is actuated whenever the housing unit is opened or closed are like those of the arrangement shown in FIGS. 3 to 6.

The spinning, drafting and winding machine shown in FIG. 2 can be similarly equipped whereby a housing unit 51 is provided as shown in dash-dot lines in FIG. 2 which may enclose three drafting rollers 11, 12 and 13. If desired, the enclosed space may be divided into several compartments by means of separating walls 52.

I claim:

1. In a machine for treating textile thread material and including means for drafting thread material and heated rotatable guide elements for guiding and heating thread material:

stationary housing means surrounding said rotatable elements, said housing means being provided with sluice means forming passages for thread material running from the outside into said housing means and unto said guide elements and for thread material running from said guide elements and from the inside to the outside of said housing means, said sluice means including means inhibiting exchange of gaseous matter at the inside and the outside of said housing means.

2. In a machine for treating textile thread material and including means for drafting thread material and heated rotatable guide elements for guiding and heating thread materials:

stationary housing means surrounding said rotatable elements, and means connected to said housing means for supplying atmosphere conditioning media to and releasing said media from said housing means.

3. In a machine for treating textile thread material and including means for drafting thread material and heated rotatable guide elements for guiding and heating thread material:

stationary housing means surrounding said rotatable elements, said housing means being composed of a plurality of parts, at least one of said parts being movable relative to the other parts for temporarily opening said housing means and providing access to said rotatable elements.

4. In a machine as defined in claim 3, actuating means connected to said movable parts of a plurality of said housing means for simultaneously moving said movable parts for opening a plurality of said housing means, said actuating means including means affording individual movement of said movable parts for individually moving said movable parts and opening the respective housing means.

5. In a machine for treating textile thread material and including means for drafting thread material and heated rotatable guide elements for guiding and heating thread material:

stationary housing means surrounding said rotatable elements, said housing means being composed of a plurality of parts, at least one of said parts being movable relative to the other parts for temporarily opening said housing means and providing access to said rotatable elements, means connected to said housing means for supplying atmosphere conditioning media to and releasing said media from said housing means, and valve means conected to said supply means and to said movable parts for stopping supply of atmosphere conditioning media to said housing means when said movable parts are moved for opening said housing means, and vice versa.

References Cited

The following references, cited by the Examiner, are of record in the patented file of this patent or the original patent.

UNITED STATES PATENTS

| | | | |
|---|---|---|---|
| 2,433,842 | 1/1948 | Griffin | 26—62 X |
| 3,146,572 | 9/1964 | Keyser | 57—1 |
| 3,159,964 | 12/1964 | Kretsch | 28—71.3 X |
| 3,221,385 | 12/1965 | Stanley | 28—72 |

LOUIS K. RIMRODT, Primary Examiner